(12) United States Patent
Chen

(10) Patent No.: US 6,318,741 B1
(45) Date of Patent: Nov. 20, 2001

(54) SKATEBOARD FOLDING STRUCTURE

(75) Inventor: Ting-Hsing Chen, Tainan Hsien (TW)

(73) Assignee: Far Great Plastics Industrial Co., Ltd., Tainan Hsien (TW)

(*) Notice: Subject to any disclaimer, the term of this patent is extended or adjusted under 35 U.S.C. 154(b) by 0 days.

(21) Appl. No.: 09/498,629

(22) Filed: Feb. 7, 2000

(51) Int. Cl.[7] .................................................. B62M 1/00
(52) U.S. Cl. ............................. 280/87.041; 280/87.042; 280/87.05; 16/900
(58) Field of Search ...................... 280/87.041, 87.05, 280/87.042, 87.021, 287; 16/900

(56) References Cited

U.S. PATENT DOCUMENTS

| | | | |
|---|---|---|---|
| 4,462,606 | * | 7/1984 | Hon ........................................ 280/278 |
| 4,707,884 | * | 11/1987 | Chang ..................................... 16/113 |
| 4,750,578 | * | 6/1988 | Brandenfels ............................ 180/13 |
| 4,821,832 | * | 4/1989 | Patmont ................................ 180/208 |
| 5,388,659 | * | 2/1995 | Pepe ...................................... 180/219 |
| 5,848,660 | * | 12/1998 | McGreen .............................. 180/206 |
| 6,120,044 | * | 9/2000 | Tsai ..................................... 280/87.05 |
| 6,173,976 | * | 1/2001 | Lee ..................................... 280/87.05 |

* cited by examiner

Primary Examiner—Lanna Mai
Assistant Examiner—Christopher Buchanan
(74) Attorney, Agent, or Firm—Rosenberg, Klein & Lee

(57) ABSTRACT

A skateboard folding structure is provided having an upper connecting member (31) pivotally joined to a lower connecting member (32). The upper connecting member (31) is formed on a lower end of a handle member (21). The lower connecting member (32) is received within a skateboard frame member (11). A quick release connector (4) releasably clamps the upper connecting member (31) and selectively prevents rotation of the handle member (21) about skateboard frame member (11).

2 Claims, 5 Drawing Sheets

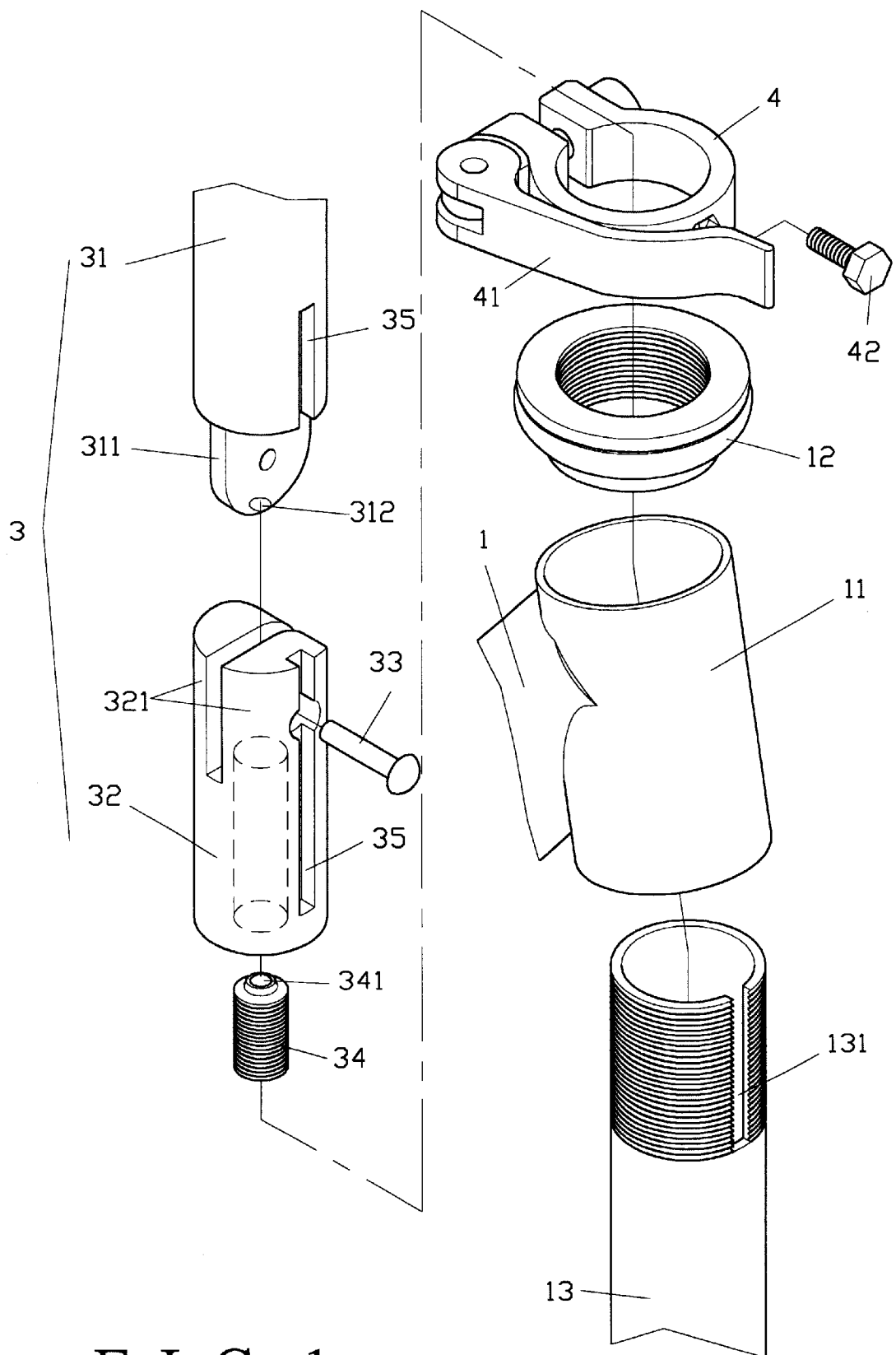
F I G. 1

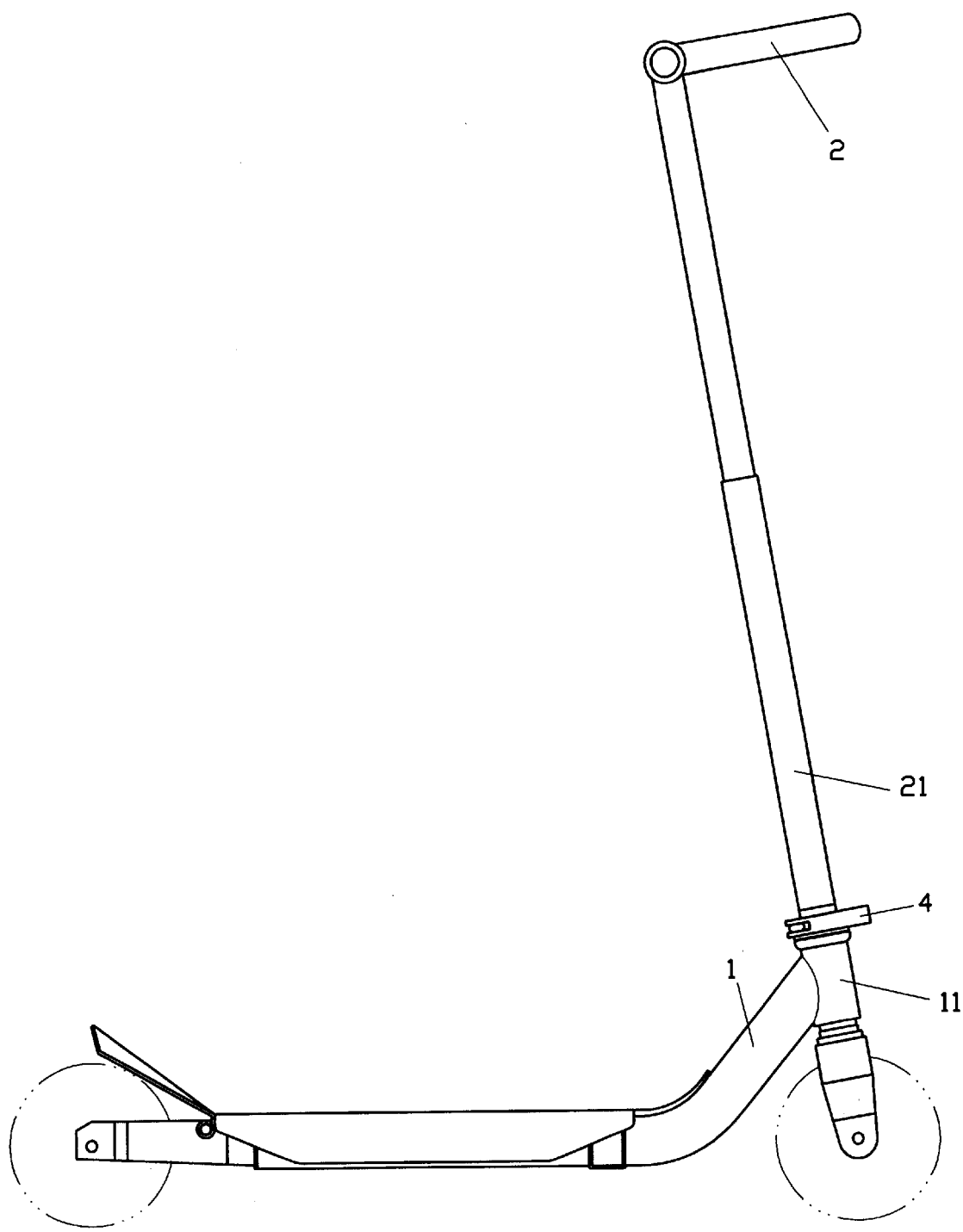
F I G. 5

SKATEBOARD FOLDING STRUCTURE

BACKGROUND OF THE INVENTION

Field of the Invention

This invention relates to a skateboard folding structure, and more particularly to a structure which is hidden in the frame and secured by a quick release connector.

The conventional skateboard is constructed of a board with a pair of wheels mounted on the front and the rear ends of the board, whereas a skater steps on the board with one foot and pushes himself forward by another foot. This is good in pleasure and exercise, however, it is designed only to move straight, towards one direction, and is not able to make turns or so on which is less excitement to youngster. Thus, a new design of a skateboard with a handle is devised which is able to turn by operating the handle, but it is inconvenient to store and carry.

BRIEF SUMMARY OF THE INVENTION

It is the primary object of the present invention to provide a skateboard having a folding structure which is easy to fold and unfold.

It is another object of the present invention to provide a skateboard having a folding structure which is easy to both install and remove.

It is a further object of the invention to provide a skateboard having a folding structure which may be folded into an optimally compact state when not in use and is easy to both carry and store.

BRIEF DESCRIPTION OF THE DRAWINGS

FIG. 1 is an exploded view of the present invention;

FIG. 5 is a front section view which is similar to FIG. 3, showing a third operation status.

DETAILED DESCRIPTION OF THE PREFERRED EMBODIMENT

Figure 2:
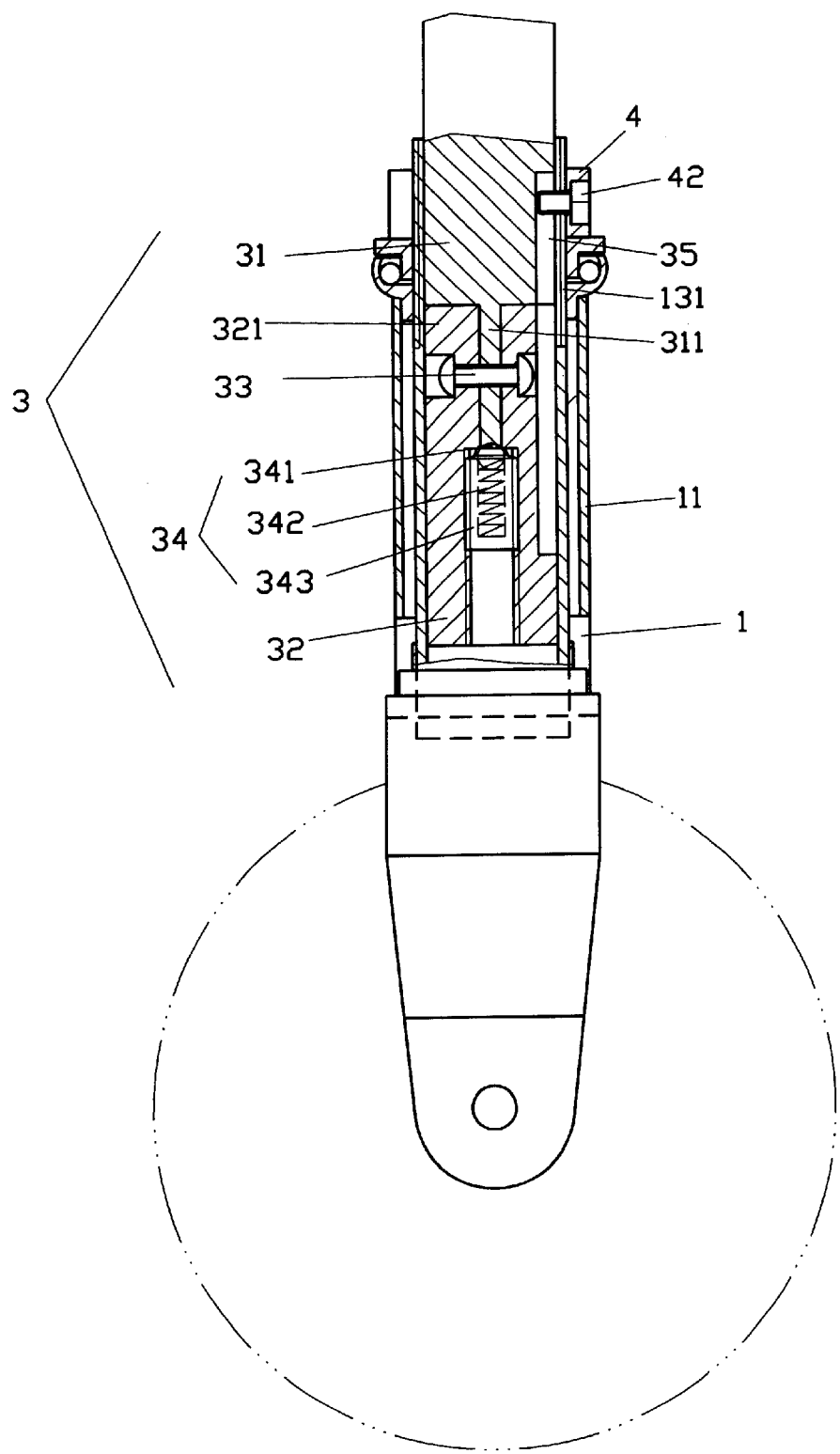
FIG. 2 is a front view of the present invention, with partially sectioned.

The skateboard of the present invention, as shown in FIGS. 1 and 2, comprises a frame 1 having a pipe 11 and a handle 2 having a pipe 21. The frame pipe 11 is connected to an inner tube 13 which comprises an open slot 131 at one end along the axis. The connecting area of the frame pipe 11 and the handle pipe 21 is jointly connected to a connector 3 which is composed of an upper section 31 having a tenon 311 at one end and a lower section 32 having a mortise 321 at one end corresponding to the tenon 311 for connection purpose and secured by a rivet 33. The lower section 32 has a block 34 formed by a spring 342 and a bearing 341 seating in a barrel 343, and whereas the tenon 311 of the upper section 31 has a recess 312 corresponding to the block 34, the connector 3 has a slot 35 axially formed thereon.

A quick release connector 4 located outside of the connector 3 has a knob 41 to fast release the connector 4. The quick release connector 4 comprises a bolt 42 at the top which is adapted to insert through an open slot 131 of the inner tube 13 and secured in the slot 35. Thus, the upper section 31 of the connector 3 is secured to the pipe 21 of the handle 2, and the lower section 32 is sleeved onto the inner tube 13 of the upper pipe 11 of the frame 1 in a slidable manner, and with the bolt 42 of the quick release connector 4 to sleeve into the slot 35.

Upon pressing the upper section 31 and the lower section 32 into the inner tube 13 of the pipe 11 and tightened by the quick release connector 4, the structure of the skateboard is more solid than a conventional one.

Figure 3:
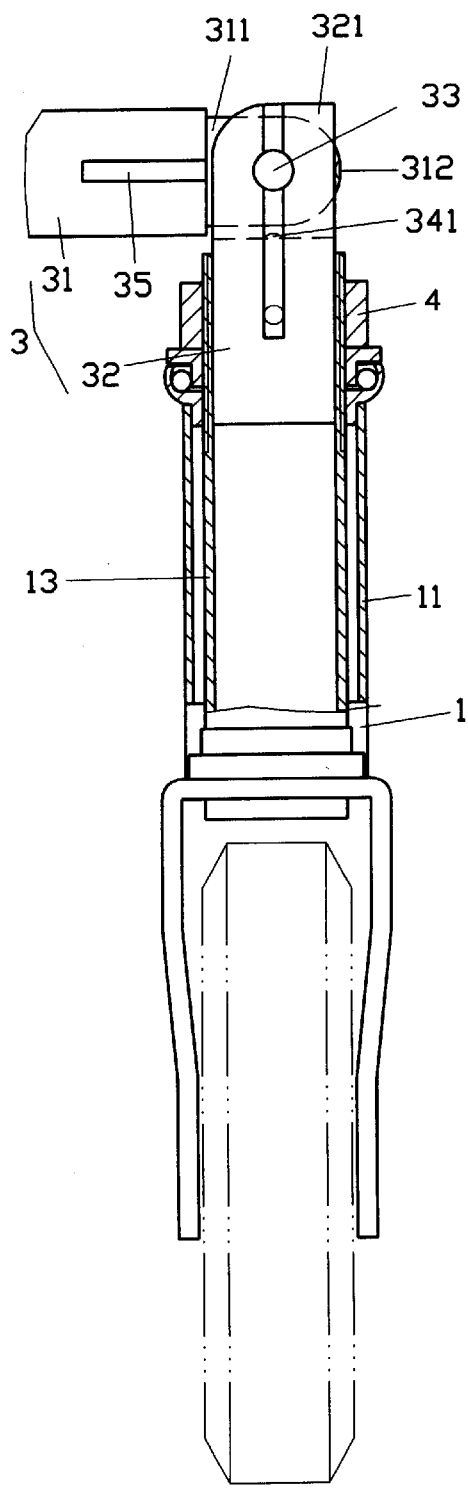
FIG. 3 is a front section view of the present invention, showing a first operation status.
Figure 4:
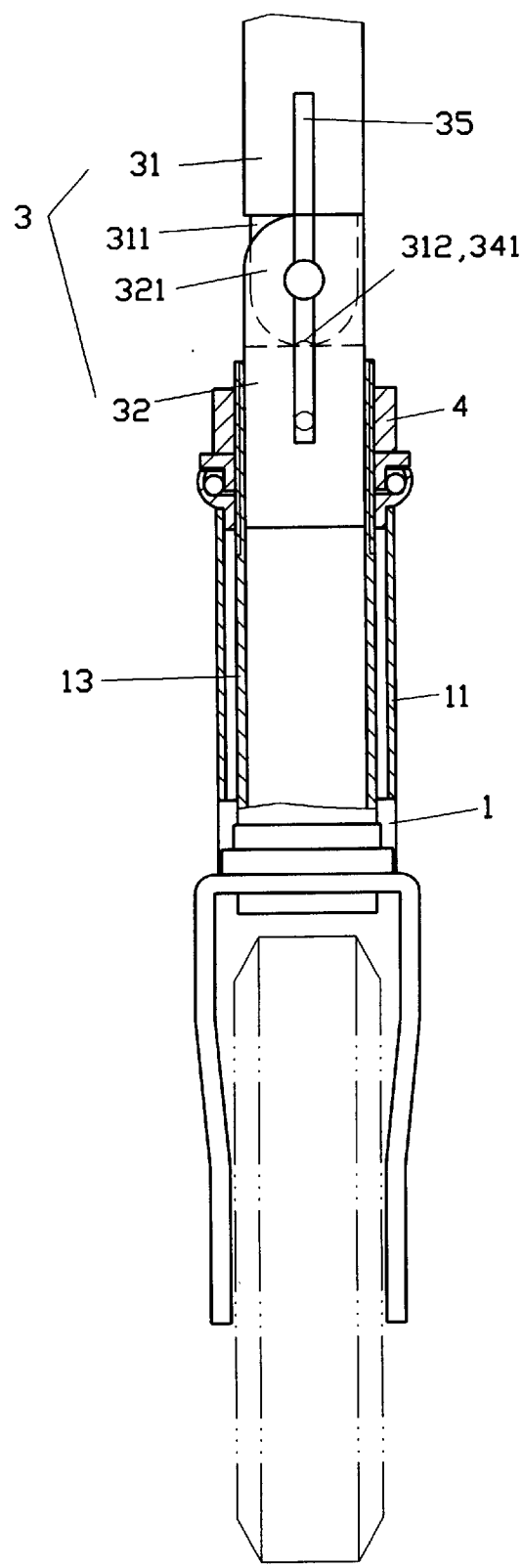
FIG. 4 is a front section view which is similar to FIG. 3, showing a second operation status.

In practice, lift the pipe 21 of the handle 2 in a straight line with respect to the pipe 11 which brings the block 34 of the upper section 31 seating in the recess 312 of the lower section 32, then press to force the two sections 31 and 32 in the tube and tightened by the quick release connector 4, as shown in FIGS. 3 through 5.

Figure 6:
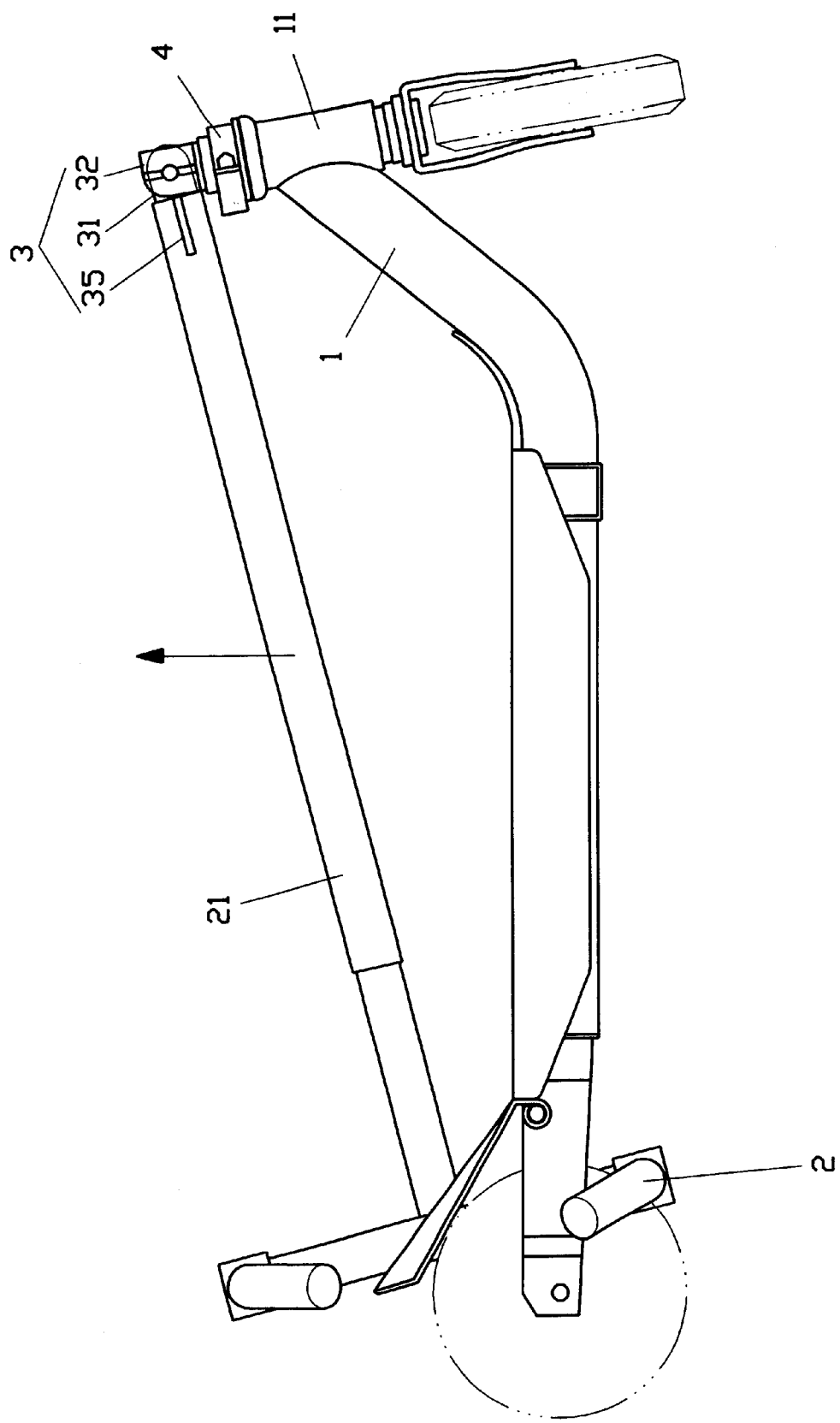
FIG. 6 is a front section view which is similar to FIG. 3, showing a fourth operation status.

In folding, as shown in FIGS. 3 through 5, pull away the knob 41 of the quick release connector 4 to loosen the connector 3, thus the handle 2 and its pipe 21 are able to be lifted up and the upper section 31 to be exposed, and the handle 2 and the pipe 21 are foldable for carrying. The handle 2 may also be secured to the frame 1, as shown in FIG. 6 for carrying purpose.

What is claimed is:

1. A connector assembly for collapsible scooters comprising:
    a cylindrical frame member having a frame recess formed therein;
    a cylindrical tube member received within said frame recess, said cylindrical tube member having upper and lower tube sections, said upper tube section projecting from an upper end of said cylindrical frame member when said cylindrical tube member is received within said frame recess, said cylindrical tube member having a cylindrical tube passage formed therethrough;
    a lower connecting member received within said cylindrical tube passage, said lower connecting member having a lower recess formed therein, said lower recess receiving a block member therein, said block member having a locking bearing projecting therefrom, said lower connecting member having a lower slot formed therethrough, said lower slot being in communication with said lower recess, said locking bearing projecting from said lower recess into said lower slot;
    a cylindrical handle member having an upper connecting member formed thereon, said upper connecting member having an upper connecting slot formed in an outer surface thereof and having an upper projection member depending from a lower surface thereof, said upper projection member having an upper projection recess formed therein, said upper projection member being received within said lower slot of said lower connecting member, said locking bearing being removably received within said upper projection recess;
    a pivotal member for pivotally joining said upper projection member with said lower connecting member; and,
    a locking annular member having a bolt hole formed therethrough, said locking annular member being positioned about said upper connecting member and being secured thereto by a bolt received within said bolt hole and said upper connecting slot, said locking annular member having locking means for slidably releasing said upper connecting member, allowing said cylindrical handle member to selectively pivot about said cylindrical frame member.

2. The connector assembly for collapsible scooters as recited in claim 1 wherein said block member is spring-biased.

* * * * *